United States Patent
Spall et al.

(10) Patent No.: US 8,666,833 B2
(45) Date of Patent: Mar. 4, 2014

(54) SYSTEM AND METHOD FOR GENERATING AN ENHANCED INDEX PRINT PRODUCT

(75) Inventors: Mark Spall, Rochester, NY (US); Seymen Ertas, Rochester, NY (US); Mike Fry, North Chili, NY (US); Jeff Bloom, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 339 days.

(21) Appl. No.: 13/121,036

(22) PCT Filed: Oct. 9, 2009

(86) PCT No.: PCT/US2009/060130
§ 371 (c)(1),
(2), (4) Date: Jun. 10, 2011

(87) PCT Pub. No.: WO2010/042795
PCT Pub. Date: Apr. 15, 2010

(65) Prior Publication Data
US 2011/0288948 A1    Nov. 24, 2011

Related U.S. Application Data

(60) Provisional application No. 61/104,246, filed on Oct. 9, 2008.

(51) Int. Cl.
*G06Q 30/00* (2012.01)
*G06K 15/00* (2006.01)

(52) U.S. Cl.
USPC ...................................... 705/26.1; 705/14.49

(58) Field of Classification Search
CPC ................................................ G06Q 30/0601
USPC ............................................ 705/14.49, 26.1
See application file for complete search history.

(56) References Cited

U.S. PATENT DOCUMENTS

| 5,608,542 | A | 3/1997 | Krahe et al. |
| 7,225,158 | B2 * | 5/2007 | Toshikage et al. ............... 705/51 |
| 7,634,425 | B2 * | 12/2009 | Satomi et al. .................... 705/16 |
| 8,120,803 | B2 * | 2/2012 | Uchida ........................ 358/1.15 |
| 8,209,602 | B2 * | 6/2012 | Chatow et al. ................ 715/255 |

(Continued)

FOREIGN PATENT DOCUMENTS

| JP | 09 292660 A | 11/1997 |
| JP | 2003 094733 A | 4/2003 |
| JP | 2006 203297 A | 8/2006 |

OTHER PUBLICATIONS

Anon., "Cinecom Releases Cinevideo/Direct 1.17," GUI Program News, vol. 8, No. 6, p. 1, Jun. 1, 1997.*

(Continued)

*Primary Examiner* — Nicholas D Rosen
(74) *Attorney, Agent, or Firm* — Woods Oviatt Gilman LLP

(57) ABSTRACT

The present invention is directed to a data driven methodology to construct index print products for photographic images. A system and method are provided for defining an index print product as a collection of regions which may be pieced together to present a final index product. The index product is customizable for and by any one or more retailers or integration partner providers for a unique appearance and offering to end customers. More specifically, the present invention relates to providing dynamic index print products of photographic images wherein the index print product may also include other content that is individually specified, provided and maintained by partner providers of a film processor or fulfillment center. Providers are able to leverage customized marketing and brand messaging or other advertisement to add value to their index print product.

7 Claims, 4 Drawing Sheets

(56) References Cited

U.S. PATENT DOCUMENTS

| | | | |
|---|---|---|---|
| 8,345,299 B2* | 1/2013 | Aoki et al. | 358/1.18 |
| 2001/0016829 A1* | 8/2001 | Toshikage et al. | 705/26 |
| 2002/0054346 A1* | 5/2002 | Fredlund et al. | 358/1.15 |
| 2004/0039641 A1* | 2/2004 | Satomi et al. | 705/14 |
| 2004/0073568 A1* | 4/2004 | Yonaha | 707/102 |
| 2005/0060662 A1* | 3/2005 | Soares et al. | 715/810 |
| 2007/0220173 A1* | 9/2007 | Ohga et al. | 709/250 |
| 2008/0291471 A1* | 11/2008 | Uchida | 358/1.6 |

OTHER PUBLICATIONS

Turner, J., "Shutterbugs on the Web," Christian Science Monitor, Monday, Oct. 30, 2000.*

Anon., "Fujifilm's Online Service Lets Digital Photographers Print Pictures Anywhere; 5,000 Retail Locations with Fujifilm's 'Get the Picture Online Service'," Business Wire, Aug. 17, 2004.*

Schreiber Translations, Inc., English Translation of Takeuchi et al., Japanese Patent Application Publication 09-292660-A, "Index Print, Apparatus for Preparing Index Print, and Index Print Manufacturing Method," translation dated Jul. 2013.*

Bakstein, Hynek, "International Search Report," mailed Dec. 11, 2009, for International Application No. PCT/US2009/060130, Rijswijk, Netherlands.

Bakstein, Hynek, "Written Opinion of the International Searching Authority," Dec. 11, 2009, for International Application No. PCT/US2009/060130, Rijswijk, Netherlands.

* cited by examiner

SYSTEM AND METHOD FOR GENERATING AN ENHANCED INDEX PRINT PRODUCT

CROSS REFERENCE TO RELATED APPLICATIONS

This application is a National Stage filing under 35 U.S.C. §371 of International Application No. PCT/US2009/060130, filed Oct. 9, 2009, which in turn claims priority to U.S. Patent Application No. 61/104,246, filed Oct. 9, 2008, both of which are hereby incorporated by reference in their entirety.

FIELD OF THE INVENTION

The present invention is generally directed to a data driven methodology to construct index print products for photographic images. A system and method are provided for defining an index print product as a collection of regions which may be pieced together to present a final index product. One or more of the regions on the index print product is customizable by one or more retailers/integration partner provider, which provides for a unique appearance and offering to their end customers. Providers are able to leverage customized marketing and brand messaging or other advertisement to add value to their index print product.

BACKGROUND OF THE INVENTION

The ability and the need to distinguish products and services is at the forefront of requirements by many industries today. Solutions to provide add-ons, additional revenue streams, marketing, and corporate branding constantly being sought by various companies. Intrinsic to these environments is how to better utilize existing mediums or products to facilitate such solutions. For example, in the photographic industry, it is common place for a customer to receive with their photo prints, an index card that contains small sized images of all of the pictures that were developed. The index card typically is sized to match the size of prints ordered by the customer, such as 4×6, 5×7, etc. This index card may include a logo and or message provided by a fulfillment center or processor that handled the film and produced the index product. While this is great advertisement and branding for the processor, it seldom if at all does any good for the retail store or other partner provider with whom the customer placed the order. There exists a need to utilize the index prints for the benefit of the company that is on the fore-front of dealing with the customer (i.e., the retail center/partner provider). Even further, there exists a need to utilize an index print in a way that can be customized to individual retailers/partner providers. Further still, there exists a need to maximize the use of the area on the index print, without unduly compromising the display of the photo images. As such, there is a need for significant improvement in the index print product.

What is needed is an enhanced index print product that will facilitate and enable the ability to, in one aspect, define index print product content at retail/partner levels, and in another aspect, present content items in a location and size that is determined and maintainable by the retailer/partner. There is currently no efficient technique for conveying individualized index print products, let alone enabling retailers/providers to specify and maintain the content of the index print product.

Accordingly there is a need for an efficient, scalable, customizable and robust technique for providing targeted index print product offerings from retailers/partner providers to their customers.

The present invention fills these needs as well as other needs.

SUMMARY OF THE INVENTION

The present invention is generally directed to a system and method that will facilitate and enable the ability to define index print product content at retail/partner levels, and present content items in a location and size that is determined and maintainable by the retailer/partner.

In one aspect, the present invention is directed to a method for providing an index print of a plurality of photographic images, wherein the index print includes viewable regions thereon. The method comprises: providing an ordering mechanism to enable a partner provider to specify content for at least one of the viewable regions, the viewable regions comprising an image display region, an order data region, and one or more provider content regions; the viewable regions sized in relation to the size of the index print in accordance with dimensions provided by the partner provider; the order data region including both static and dynamic content relating to customer order data; the image display region sized to contain and present the plurality of photographic images; and the one or more provider content regions utilized to display partner specific content.

In the above aspect, each of the viewable regions may defined as a ratio to the overall size of the index product, and each of the viewable regions may be defined as a dimension of pixels. Further, the partner specific content may be customized marketing information from the partner provider. Also, the viewable regions may be specified and determined by an order manifest file, wherein the order manifest file is an eXtensible Markup Language (XML) file and specifies the location of data files for the partner specific content.

In another aspect, the present invention includes a system for providing an index product having an area for each of consumer order information, a plurality of photographic images and custom provider content, in connection with a consumer order for the plurality of photographic images. The system comprises a partner ordering module, an order management module, and a fulfillment module. The partner ordering module is in operable communication with the order management module, to receive the consumer order information and provide the consumer order information to the order management module. The order management module is programmed to receive and validate the consumer order information and further process the consumer order to provide a work order for communication to the fulfillment module. The work order provides specifications for placement of the plurality of photographic images, the consumer order information and the custom provider content. The fulfillment module is programmed to receive the work order and process the work order to acquire the plurality of photographic images, the consumer order information and the custom provider content according to specifications in the work order and to provide the index product. The work order, which may be an order manifest, may identify a data file having therein specification of a location and size of the area for the placement of the custom provider content. The order manifest may provide informational items that are specified and managed by a partner provider. Further, the informational items may provide data content for the custom provider content.

In yet another aspect, the present invention includes a manifest data structure for use in a computing system for specifying and identifying content for an index print product having one or more customizable regions thereon for use and control by a partner provider to provide customer image data and other information. The manifest data structure comprises: a first structure item to reference a provider image object; a second structure item to reference provider textual content; a third structure item for specifying size and location of the one or more customizable regions of the index print product; a fourth structure item for identifying and specifying for each of the one or more customizable regions, the first and/or second structure items to be displayed therein; and one or more business rule items. The business rule items specify the use of the manifest structure items, wherein the manifest data structure is utilized to provide the index print product with the customer image data and provider image objects and/or textual content.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the tools and methods described herein for creating and implementing index print products, for providing customized index print products may be implemented in hardware, software or a combination thereof.

This document is organized as follows. In the first section, an overview of the techniques and implementation is provided and described. In the next section, an exemplary index print product as produced by the present invention is discussed. Following this, the specifics of the work flow and implementation for the photo ordering process is discussed, including the operational function of the present invention. Finally, an exemplary computer environment for the implementation and use of the invention is described.

Overview of Techniques and Implementations

The present invention provides a system and methodology to enable regional, domestic and international retail centers or partner providers (hereinafter "partner"), to provide add-ons, customized marketing, branding messaging or advertisement to their end customers. In other words, providers are able distinguish themselves and their index print product.

The present invention introduces a number of concepts and a unique paradigm for the grouping and utilization of information. Certain key terms need to be addressed and understood in order to appreciate the invention. The present invention is described with reference to equipment and processes relating to digital photography and more specifically, the photo ordering and fulfillment process. However, as would be appreciated by one skilled in the art, the invention may be applicable to other processes and implementations, the references and discussion provided herein are strictly for illustrative purposes and are not intended to limit the scope of the invention.

A customer is the originator of an order for photographic images. Using electronic means for image delivery or by the physical delivery of photographic film, the customer initiates a request for a finished product such as picture prints. Along with the order, a photographic index of the requested images is generally provided to the customer in the form of an index print product.

Partner in this context is a retail chain, an integration partner individual or company that interacts directly or indirectly with customers to take orders and provide finished photographic images or an index of such images to the customer.

A fulfillment center or order processor can be defined as the entity that acts upon the orders placed by the customer, through the partner. The fulfillment center may provide the end product to the customer either directly or through the partner provider. In this case, the focus is on index print product.

A region as used herein is a unit of reference for an area or portion of the index print product. A region may be described in pixels or as a ratio to the size of the index print product. Thus an index print product is a grouping of one or more regions.

Figure 1:
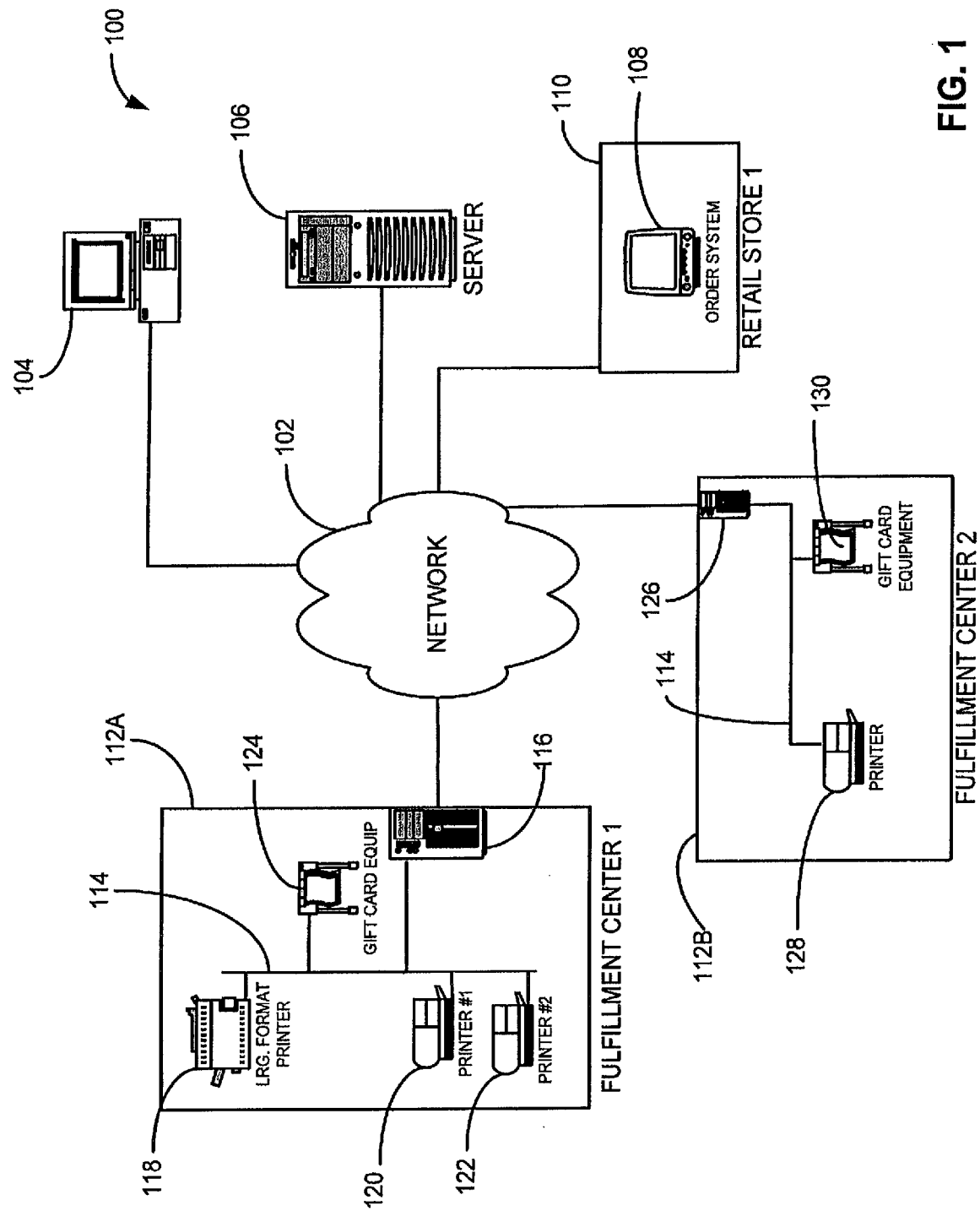
FIG. 1 generally illustrates a networking environment in which the present invention may be implemented.

Having described some base concepts of the invention, aspects of the invention will now be described with reference to the drawing figures. An exemplary environment or system to which the present invention would be applicable is shown in FIG. 1 and is designated as reference numeral 100.

The environment 100 may include a network 102, such as a Local Area Network (LAN), Wide Area Network (WAN), Wireless network or other similar configuration for allowing communication among two or more computing devices. Connected to the network 102 may be a general purpose computing device 104. Computing device 104 includes devices such as handheld devices, laptop computers or personal computers, which may be located in a home, office, retail location or other environment, and that provide an interface for user interaction with local or remote applications or systems. Computing device 104 may be a wireless device such as a cellular phone or personal digital assistant. A server 106 may also be connected to the network 102 to provide any one or more of a variety of functions including serving as a web server, data store, and application server and/or provide other services. An order device 108, located at a retail store 110 may also be connected to the network. One or more fulfillment centers 112A, 112B may also be remotely located and connected to the network 102. Each fulfillment center 112A, 112B, may have its own local area network 114 and a local server 116, 126 in addition to other devices for fulfilling use orders. The server 116, may provide local services in addition to providing communication and data exchange with network server 106. In addition to typical devices found in any office environment, the fulfillment center 112A may include a large photo format printer 118, a first photo printer 120, a second photo printer 122, and a gift card printing machine 124. Similarly, yet distinctively, fulfillment center 112B may include a local server 126, a photo printer 128 and a gift card printing machine 130.

Generally, the present invention relates to providing to a user of the computing devices 104, or a user of the ordering system, an enhanced index print product. An example of such an index print product enables the partner to provide a unique and distinctive look or feature branding information, coupons, special messages, marketing content or third party advertisement, all within the index print product space, whether this is on a computer screen or a physical card. A partner may provide data files of content, along with a specification of the location and size of such content on the index print product. Thereafter, the fulfillment center 112 processes and delivers the index print product comprising the ordered photographic images and provider specified content, in sizes and locations designated by the provider via an order manifest. The order manifest file in an embodiment of the present invention is an eXtensible Markup Language (XML) file that contains all the information that will be utilized to render or otherwise produce the index print product.

In order to provide the index print product to the customer one or more software programs, typically an ordering manifest system allows a provider to specify among other things: the size of the index print product (e.g., 4×6); the number of images in the order; partner logo; customer information; order specifics; partner information; any other content desired by the partner along with information on where items should be located on the index print product; and any business rules for the fulfillment processor. The present invention provides means for partners to provide this information, as well as maintain such information. More specifically, the present invention provides a methodology for a collaborative yet distinctive and individualized mapping of regions on an index print product. A partner is able to specify content and location of content by providing appropriate entries within the order manifest file.

Representative Implementation

Figure 2:
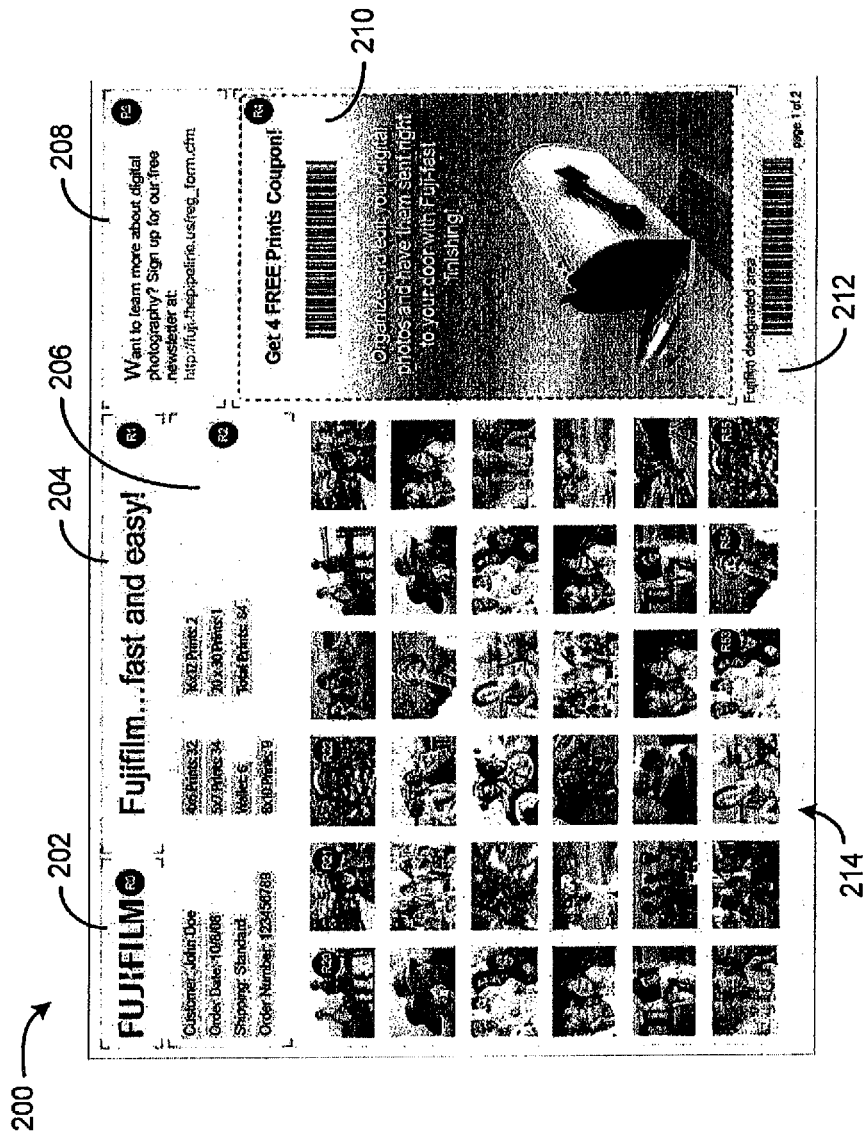
FIG. 2 is a block diagram generally illustrating an exemplary embodiment of the print index product of the present invention and components thereof.

The present invention and the advantages thereof can be further appreciated by considering a representative implementation. The design and implementation of an exemplary index print product in accordance with the present invention is best described with reference to FIG. 2. FIG. 2 provides an exemplary index print product 200. For the purpose of illustration, the index print product 200 is described hereafter in the context of a 4×6 card, on which the photographic images ordered by a customer will be displayed. However, it will be understood that any size print product may be used in accordance with the present invention. As shown, the index print product 200 comprises multiple regions 202-212. Each region 210-212 may be uniquely and independently sized and may also be further divided into further smaller regions. A partner working in conjunction with a fulfillment processor provides specific dimensions for each region that will comprise the partner's unique version of the enhanced index print product 200.

The regions 210-212 fit together in a jig-saw like manner for a final result that is produced with customer image data, order data and partner content. An order manifest, described in further detail later in this document, enables the partner to map their specific content to the corresponding regions 210-212. Using the order manifest, all content is created, maintained and made available by the partner. The partner is able to create and maintain images for the various regions 210-212 at the partner's site. The fulfillment processor, such as, for example, Fujifilm labs, can access appropriate images or content based on references provided by the partner in the order manifest, which is provided to the fulfillment processor. As would be appreciated by one skilled in the art, the regions 210-212 may be arranged in any order and specified to contain any variety or type of content, including but not limited to text, images or other objects.

Region 202 may be reserved for a partner logo or other information that the partner wishes to locate in that area of the index print product 200. In an embodiment of the present invention, region 202 is sized at 348 pixels by 100 pixels for the exemplary 4×6 index print product 200 described herein. Partners have the option to review and approve the dimensions of this or any other region prior to implementation by the fulfillment processor.

Region 204, may be utilized for partner messaging, and serve as a "header" region for a tagline or other appropriate messaging. For example, a message such as "Thank you for your business" or a slogan as shown in the exemplary index print product 200 may be placed in this area. An image reference or other references for this location may be specified at 805 pixels by 100 pixels. Region 206 may be reserved for partner customer and order related informational items.

Region 206 may be sized at 1163 pixels by 202 pixels. In operation, the content of region 206 may be derived by combining certain static content with dynamic values. Static content may be field names like "Customer:", "Order Date", etc. Dynamic values may include customer name, date of order, order number, product, product quantity etc. Static content is specified by the partner during initial negotiations and product configuration, while the dynamic content is provided as individual orders are placed. Further still, the static content may also be language translations, thereby enabling the fulfillment processor to accommodate partners that have a foreign language requirement.

Translation strings may be sent by the partner in the order manifest or may be hosted by the fulfillment processor. In either case, translation strings should be in place before the index print product can be composited and manufactured. As previously noted, the partner is responsible for creating and providing all translated content and both the static and dynamic items. An example taken from index print product 200 further illustrates this feature.

Turning to the displayed content of the region 206, the following is textual information is provided:

Customer: John Doe

In this English language example, "Customer:" would be static content provided by the partner (this term would be translated if appropriate); "John Doe" would be dynamic content that the fulfillment processor—Fujifilm lab, would pull from the order manifest. These two pieces of information would be combined at the fulfillment lab to create the complete line seen on the enhanced index print product 200. This rendering and combining process would be done for each line described for region 206. Accordingly, each line in region 206 is comprised of two components:

Static:Dynamic

Region 208 may be utilized for general partner messaging and have a size of 584 pixels by 204 pixels for the illustrated index print product 200. As previously described, region 208 may contain some third party advertisement, coupon or any other content desired by the partner.

Region 210 may be utilized for larger scale partner messaging, branding, marketing or other similar functions. This area may be sized at 584 pixels by 832 pixels.

An area or portion 212 of the index print product 200 may be reserved by the fulfillment processor for locating a bar code or other information that may be internally used by the fulfillment processor for its business purposes. This area may be sized at 584 pixels by 103 pixels.

Region 214 may be utilized to represent the customer image data, which represents the primary content of index print product 200. Region 214, as shown, includes a plurality of customer images R20-R55. Each of the customer images R20-R55, would be sized to fit within the area of region 214. Region 214 may be sized at 805 pixels by 100 pixels for the 4×6 product described herein. As would be appreciated by one skilled in the art, region 214 may be subdivided to accommodate any number of images contained within a customer's order or the number of images that may be deemed appropriate for meaningful viewing by the naked human eye.

Having described the enhanced index print product, attention is next directed to a work flow that is implemented to arrive at the index print product 200. A discussion of the work flow will further highlight some of the salient features of the invention. The exemplary work flow relates directly to the previously discussed index print product 200 in a photo ordering process.

Figure 3:
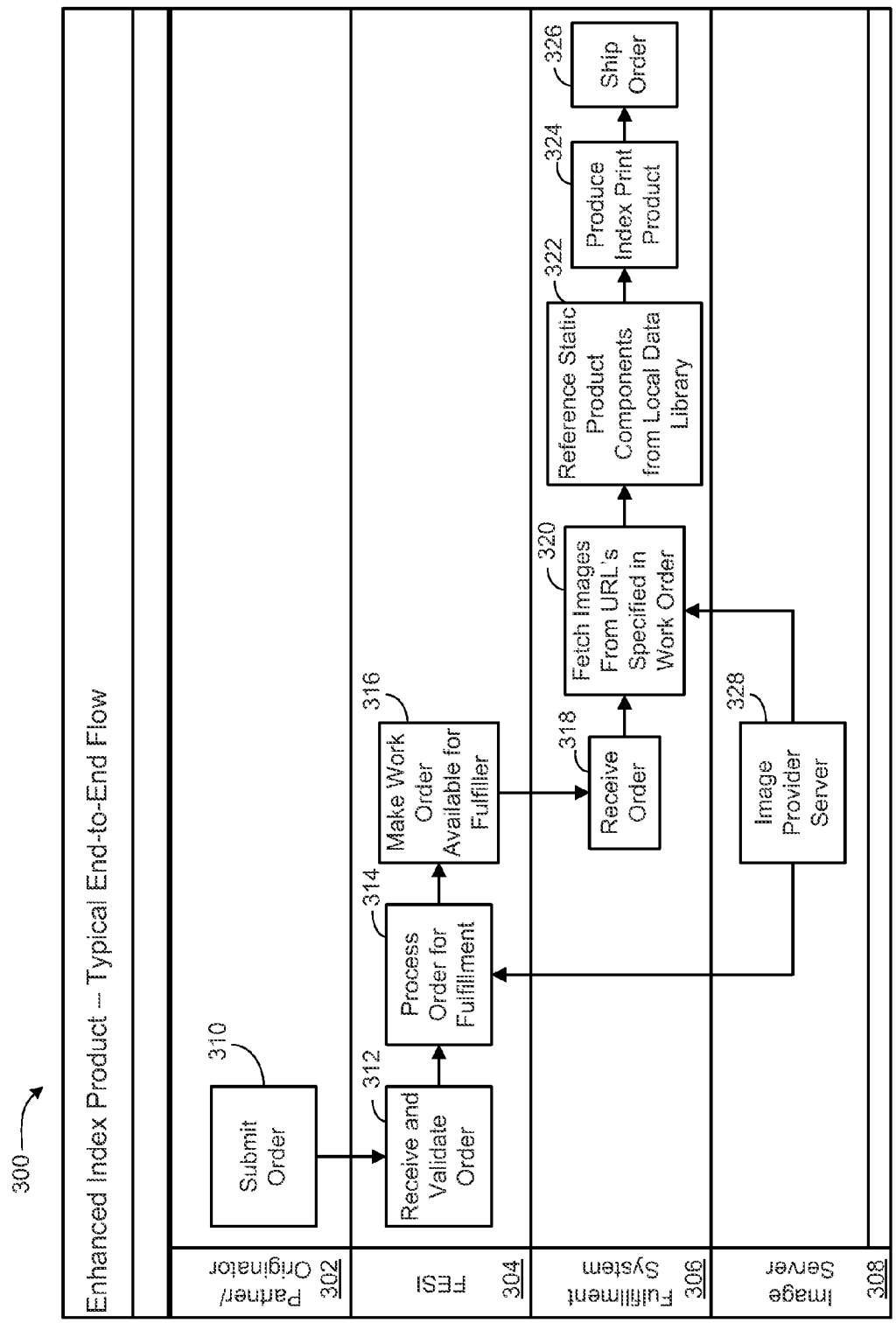
FIG. 3 is flow chart generally illustrating a procedure for enabling a partner provider to specify and allocate content to regions of the index print product of FIG. 2.

The work flow is best described with reference to FIG. 3. The system and method of the present invention is best conceptualized by considering a workflow 300 comprising four components 302-308. The first component is a partner/originator 302. The second is an order management system (FESI) 304. The third is a fulfillment system 306, and the fourth is an image server system 308. Any one of these components may be a combination of software and/or hardware and the functions performed within any one component are not strictly limited to such component. To the contrary, functions may be dispersed among the components 302-308 or consolidated there within.

In an embodiment of the present invention, the originator component 302 enables a partner to initiate the workflow process by submitting an order, at step 310. Next, the order management system 304, receives and validates the order at step 312. Following this the order is processed for fulfillment, at step 314. A work order for the fulfillment process or fulfillment center is then created, at step 316.

The fulfillment system 306 is then able to retrieve the order, at step 318. As previously described the order may be in the form of a manifest order which may then be parsed and interpreted. At step 320, images specified within the order manifest, in this case the URL for the images or content, that will be placed on the enhanced index print product 200 are acquired. The images are located on a provider's server system 328. Utilizing a data library, which is preferably located at the fulfiller's site, static content information is obtained and applied to the dynamic content provided within the order manifest, at step 322. The index print product is then produced at step 324 and the order is shipped to either the customer or the provider, at step 326.

The system and method of the present invention, preferably provides a convention/set of rules for the structure, content and use of the tags in the order manifest XML file, thereby providing an interrelationship among the several data items contained therein an the regions of the index print product 200. This provision enables the design and implementation of an easily maintained system, for providing relevant content for the regions of the index print product 200 from multiple partners for the partner's individual customers. Even further, this provision makes the system flexible, scalable, and robust.

Having described the system and method of the present invention and an embodiment thereof, an exemplary computer environment for implementing the described design and execution is presented next.

Figure 4:
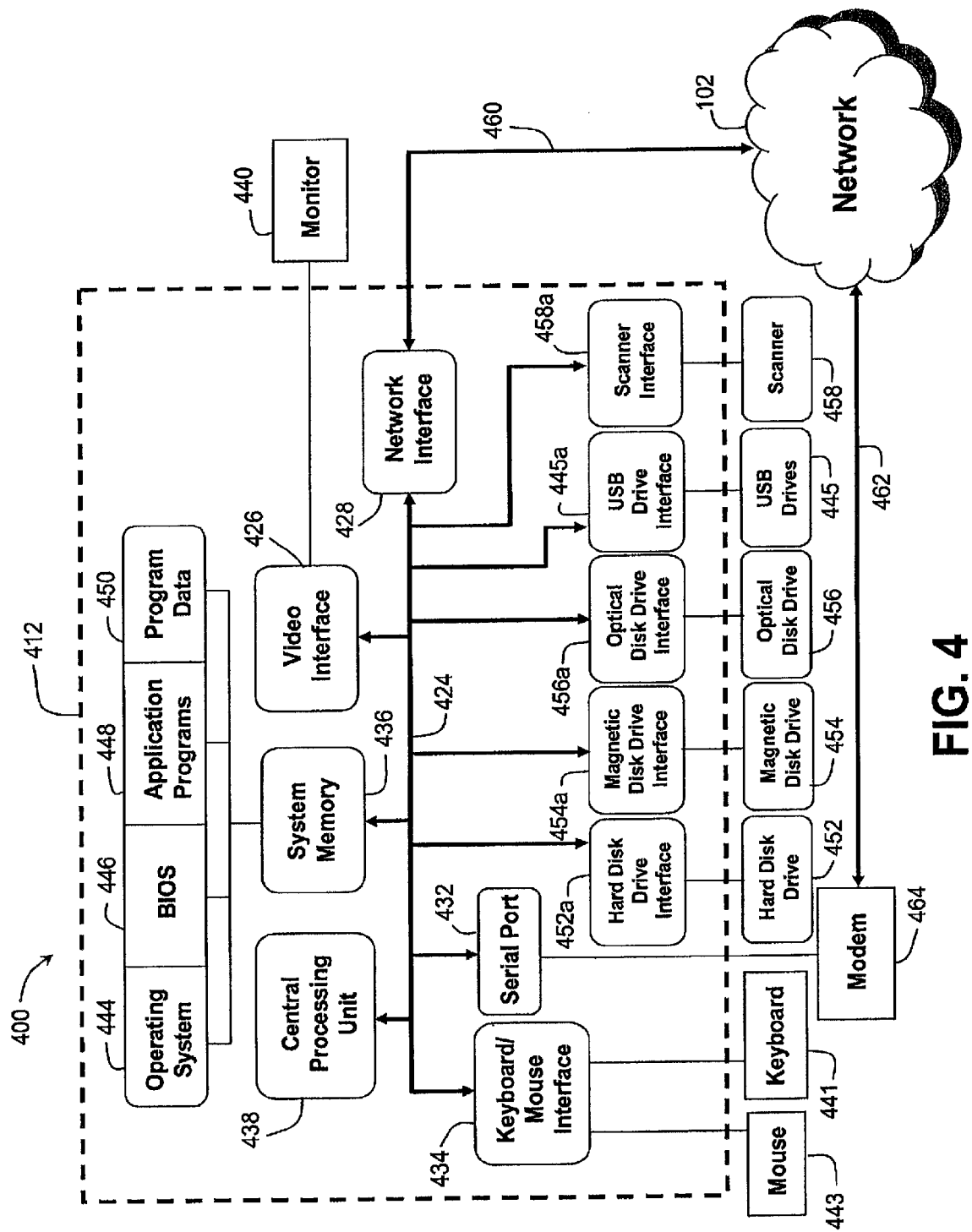
FIG. 4 is a block diagram generally illustrating a computing environment in which the invention may be implemented.

FIG. 4 shows an exemplary computing environment 400 that can be used to implement any of the processing thus far described. The computing environment 40 may comprise a computer 412, such as a personal computer, including a system bus 424 that couples a video interface 426, network interface 428, one or more serial ports 432, a keyboard/mouse interface 434, and a system memory 436 to a Central Processing Unit (CPU) 438. A monitor or display 440 is connected to bus 424 by video interface 426 and provides the user with a graphical user interface to view, edit, and prepare a print order data file using the digitally represented still images. The graphical user interface allows the user to enter commands and information into computer 412 using a keyboard 441 and a user interface selection device 443, such as a mouse or other pointing device. Keyboard 441 and user interface selection device are connected to bus 424 through keyboard/mouse interface 434. The display 440 and user interface selection device 443 are used in combination to form the graphical user interface which allows the user to implement at least a portion of the present invention. Other peripheral devices may be connected to computer 412 through serial port 432 or universal serial bus (USB) drives 445 to transfer information to and from computer 412. For example, cameras and camcorders may be connected to computer 412 through serial port 432 or USB drives 445 so that data representative of a digitally represented still image or video may be downloaded to system memory 436 or another memory storage device associated with computer 412 so that the images may be subsequently printed by fulfillment centers 112 in accordance with the present invention.

The system memory 436 is also connected to bus 424 and may include read only memory (ROM), random access memory (RAM), an operating system 444, a basic input/output system (BIOS) 446, application programs 448 and program data 450. The computer 412 may further include a hard disk drive 452 for reading from and writing to a hard disk, a magnetic disk drive 454 for reading from and writing to a removable magnetic disk (e.g., floppy disk), and an optical disk drive 46 for reading from and writing to a removable optical disk (e.g., CD ROM or other optical media). The computer 412 may also include USB drives 445 and other types of drives for reading from and writing to flash memory devices (e.g., compact flash, memory stick/PRO and DUO, SD card, multimedia card, smart media xD card), and a scanner 450 for scanning items such as still image photographs to be downloaded to computer 412. A hard disk interface 452a, magnetic disk drive interface 454a, a optical drive interface 456a, a USB drive interface 445a, and a scanner interface 458a operate to connect bus 424 to hard disk drive 452, magnetic disk drive 454, optical disk drive 456, USB drive 445 and a scanner 458, respectively. Each of these drive components and their associated computer-readable media may provide computer 412 with non-volatile storage of computer-readable instruction, program modules, data structures, application programs, an operating system, and other data for the computer 412. In addition, it will be understood that computer 412 may also utilize other types of computer-readable media in addition to those types set forth herein, such as digital video disks, random access memory, read only memory, other types of flash memory cards, magnetic cassettes, and the like.

Computer 412 may operate in a networked environment using logical connections with fulfillment centers 112. Network interface 428 provides a communication path 460 between bus 424 and network 420, which allows a print order data file to be communicated through network 420 to fulfillment centers 112 after the print order data file has been established, and optionally saved in a memory, using computer 412. This type of logical network connection is commonly used in conjunction with a local area network (LAN). The print order data file may also be communicated from bus 424 through a communication path 462 to network 420 using serial port 432 and a modem 464. Using a modem connection between the computer 412 and fulfillment processor 108 is commonly used in conjunction with a wide area network (WAN). It will be appreciated that the network connections shown herein are merely exemplary, and it is within the scope of the present invention to use other types of network connections between computer 412 and fulfillment processor 112 including both wired and wireless connections.

From the foregoing, it will be seen that this invention is one well adapted to attain all the ends and objects hereinabove set forth together with other advantages which are obvious and which are Inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for generating an index print product, the index print product including viewable regions thereon, the method comprising:
   providing an ordering mechanism to enable a partner provider to specify content for at least one of said viewable regions;
   said viewable regions comprising:
      an image display region;
      an order data region; and
      one or more provider content regions;
   said viewable regions sized in relation to the size of the index print product in accordance with dimensions provided by said partner provider;
   said order data region including both static and dynamic content relating to customer order data;
   said image display region sized to contain and present a plurality of photographic images;
   said one or more provider content regions utilized to display partner specific content; and
   generating by a fulfillment system the index print product including said viewable regions.

2. The method of claim 1, wherein each of said viewable regions is defined as a ratio to the overall size of the index product.

3. The method of claim 1, wherein each of said viewable regions is defined as a dimension of pixels.

4. The method of claim 1 wherein said partner specific content is customized marketing information from said partner provider.

5. The method of claim 1, wherein said viewable regions are specified and determined by an order manifest file.

6. The method of claim 5, wherein said order manifest file is an eXtensible Markup Language (XML) file.

7. The method of claim 5, wherein said order manifest file specifies the location of data files for the partner specific content.

* * * * *